US012689508B2

(12) United States Patent
Grobelny et al.

(10) Patent No.: US 12,689,508 B2
(45) Date of Patent: Jul. 21, 2026

(54) WORKSPACE ORCHESTRATION WITH EPHEMERAL HARDWARE ATTESTATION

(71) Applicant: Dell Products L.P., Round Rock, TX (US)

(72) Inventors: Nicholas D. Grobelny, Evergreen, CO (US); Joseph Kozlowski, Broken Arrow, OK (US); Charles D. Robison, Buford, GA (US)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 18/432,245

(22) Filed: Feb. 5, 2024

(65) Prior Publication Data

US 2025/0254040 A1      Aug. 7, 2025

(51) Int. Cl.
*H04L 9/14*            (2006.01)

(52) U.S. Cl.
CPC ...................................... *H04L 9/14* (2013.01)

(58) Field of Classification Search
CPC ......................................................... H04L 9/14
See application file for complete search history.

(56) References Cited

U.S. PATENT DOCUMENTS

| | | | | |
|---|---|---|---|---|
| 10,037,433 B2 * | 7/2018 | Diep | ................... | G06F 21/6227 |
| 2006/0010125 A1 * | 1/2006 | Beartusk | ................ | G06Q 10/10 |

| | | | | |
|---|---|---|---|---|
| 2008/0163156 A1 * | 7/2008 | Grey | ......................... | G06F 8/24 |
| | | | | 717/101 |
| 2014/0359484 A1 * | 12/2014 | Morecki | .............. | G06F 3/0481 |
| | | | | 715/753 |
| 2015/0149776 A1 * | 5/2015 | Chastain | ............... | H04L 63/061 |
| | | | | 713/168 |
| 2015/0154598 A1 * | 6/2015 | Forte | ................. | G06Q 20/1085 |
| | | | | 380/28 |
| 2015/0310188 A1 * | 10/2015 | Ford | ..................... | H04L 63/101 |
| | | | | 726/28 |
| 2016/0378439 A1 * | 12/2016 | Straub | ....................... | G06F 8/61 |
| | | | | 717/107 |
| 2018/0026907 A1 * | 1/2018 | Miller | ..................... | G06F 3/064 |
| 2021/0136047 A1 * | 5/2021 | Wilson | .................. | H04L 9/0861 |
| 2022/0200796 A1 * | 6/2022 | Robison | .............. | G06F 9/45558 |
| 2023/0020730 A1 * | 1/2023 | Rasbornig | ................. | H04L 9/12 |

* cited by examiner

*Primary Examiner* — Yonas A Bayou
(74) *Attorney, Agent, or Firm* — Fogarty LLP

(57) ABSTRACT

Systems and methods for workspace orchestration with ephemeral hardware attestation are described. In an illustrative, non-limiting embodiment, an Information Handling System (IHS) may include a processor and a memory coupled to the processor, the memory having program instructions stored thereon that, upon execution by the processor, cause the IHS to: transmit measurement data from a local management agent to a workspace orchestration service; receive, at the local management agent in response to attestation of the measurement data by the workspace orchestration service, a workspace definition configured to enable the local management agent to instantiate a workspace; and instantiate the workspace.

17 Claims, 6 Drawing Sheets

400

ENVIRONMENT 202

USER
201

IHS
100

LAUNCH POINT 203

200A

INITIAL PRODUCTIVITY AND
SECURITY CONTEXT
204

INITIAL SECURITY AND
PRODUCTIVITY TARGETS
205

WORKSPACE ORCHESTRATION SERVICE
206

CALCULATE SECURITY AND PRODUCTIVITY TARGETS 207

CREATE WORKSPACE DEFINITION 208

200B

COORDINATE ASSEMBLY 209

OPERATE
WORKSPACE
211

INSTANTIATE
WORKSPACE
210

TERMINATE
WORKSPACE
212

RETIRE
WORKSPACE
213

200C

200

300A

START
401

REQUEST WORKSPACE
402

CREATE EPHEMERAL
CREDENTIALS AND SIGN/ENCRYPT
MEASUREMENT DATA
403

RECEIVE FILES AND INSTANTIATE
WORKSPACE
404

CONTINUOUS
ATTESTATION
405

YES

NO

TEAR DOWN WORKSPACE AND
ERASE CREDENTIALS
406

END
407

400

WORKSPACE ORCHESTRATION WITH EPHEMERAL HARDWARE ATTESTATION

FIELD

This disclosure relates generally to Information Handling Systems (IHSs), and, more specifically, to systems and methods for workspace orchestration with ephemeral hardware attestation.

BACKGROUND

As the value and use of information continue to increase, individuals and businesses seek additional ways to process and store it. One option is an Information Handling System (IHS).

An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or for a specific use, such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs provide users with capabilities for accessing, creating, and manipulating data, and often implement a variety of security protocols to protect it. Historically, IHSs have been designed to implement security paradigms that isolate them from possible security threats, much like a castle is designed and constructed to safeguard persons within its walls.

In the case of a network of IHSs, for example, security systems implement strategies that isolate the entire network from threats. In effect, "castle walls" are constructed around the entire network. While working from within those walls, users may be provided with secure and productive use of data.

However, security paradigms that isolate protected data within the walls of a castle are increasingly frustrated by the realities of modern computing. Nowadays, users expect to access protected data using a plethora of different IHSs while located at a variety of physical locations. To leverage the security of the system providing access to the data, current protocols for supporting remote access have sought to extend the defenses of the system to remote IHSs, essentially extending the castle walls to temporarily include all or part of the remote IHSs.

Another complication of modern computing is the user's expectation that they will be able utilize their own personal IHSs to access some or all their protected data, even if those users are provided with enterprise issued IHSs for accessing it. For administrators of such systems, this increases the difficulty in securing all manners in which protected data may be accessed. This difficulty is greatly expanded by the need to support access to protected data using an ever-growing list of software applications, whether on a personal IHS or an enterprise issued IHS.

Moreover, the administration of such systems is further complicated by the need to support access to protected data from a variety of physical locations and via a variety of networks, including untrusted networks. Faced with such problems, systems for providing access to protected data are often burdensome to administer and ultimately the data is insufficiently protected to facilitate its productive use.

A technique for securing access to protected data accessed via an IHS is to isolate the data within a segregated or virtualization environment that runs on the IHS using a virtual machine or container. Conventional types of virtualization environments provide varying degrees of isolation from the hardware and operating system of the IHS.

However, similarly to the castle wall defenses of security paradigms that seek to isolate protected data within a secure perimeter, conventional virtualization environments are also ill-suited to modern computing. Particularly, these virtualization techniques establish an isolated computing environment on an IHS that allows a user to access only data and applications approved for that user.

In some instances, conventional virtualization techniques may determine the data, applications, and protections to be provided by on an IHS based solely on the identity of the user, and therefore tend to implement all security protocols that would be necessary to secure access to all approved data and applications. The inventors hereof have determined, however, that not only does conventional virtualization result in complex efforts that consume large portions of the memory and processing capabilities of the IHS, but it also does not account for what the user intends to do while operating the IHS.

As the inventors hereof have recognized, modern computing ought to provide users with access to protected data via a variety of IHSs and at practically any location. Yet conventional virtualization fails to account for the context in which an IHS is being used during a particular session, much less to account for changes to the context in which an IHS is used during a session. Furthermore, conventional virtualization techniques tend to provide support for many capabilities that are not used. The overhead required to provide such unnecessary capabilities unduly burdens the operation of an IHS and degrades productivity and user experience.

SUMMARY

Systems and methods for workspace orchestration with ephemeral hardware attestation are described. In an illustrative, non-limiting embodiment, an Information Handling System (IHS) may include a processor and a memory coupled to the processor, the memory having program instructions stored thereon that, upon execution by the processor, cause the IHS to: transmit measurement data from a local management agent to a workspace orchestration service; receive, at the local management agent in response to attestation of the measurement data by the workspace orchestration service, a workspace definition configured to enable the local management agent to instantiate a workspace; and instantiate the workspace.

The measurement data may be encrypted with a private key paired to a public key, and the program instructions may cause the IHS to transmit the public key to the workspace orchestration service. The program instructions, upon execution, may cause the local management agent to produce the private and public keys in response to a request for the measurement data by the workspace orchestration service.

The program instructions, upon execution, may cause the local management agent to transmit the measurement data in response to a determination, by the workspace orchestration service, that a security score of the IHS is below a selected value.

The security score may be calculated, at least in part, based upon at least one of: a risk metric associated with a locale of the IHS, a risk metric associated with a network of the IHS, a risk metric associated with hardware of the IHS, a risk metric associated with a requested datafile, or a regulatory risk metric.

The measurement data may not identify the IHS or any user of the IHS. For example, the measurement data may be produced based, at least in part, upon at least one of: a firmware measurement or hash, a software measurement or hash, a Software Bill of Materials (SBOM), or a Trusted Platform Module (TPM) quote. To attest the measurement data, the workspace orchestration service may be configured to compare the measurement data against golden measurement data.

The program instructions, upon execution, may cause the IHS to transmit additional measurement data from the local management agent to the workspace orchestration service after the instantiation of the workspace, where the additional measurement data is encrypted with the private key.

The workspace orchestration service may be configured to request the local management agent to tear down the workspace in response to the additional measurement data not matching golden measurement data. Additionally, or alternatively, the workspace orchestration service may be configured to request the local management agent to erase the private key in response to the additional measurement data not matching golden measurement data.

In another illustrative, non-limiting embodiment, a memory storage device may have program instructions stored thereon that, upon execution by one or more processors of an IHS of a workspace orchestration service, may cause the IHS to: in response to a request from a client IHS to instantiate a workspace, request measurement data from the client IHS, wherein the measurement data does not identify the client IHS or a user of the client IHS; and transmit, to the local management agent in response to attestation of the measurement data, a workspace definition configured to enable the local management agent to instantiate the workspace.

The program instructions, upon execution, may cause the IHS to decrypt the measurement data with a temporary public key provided by the client IHS. The program instructions, upon execution, may further cause the IHS to request the measurement data in response to a determination, by the workspace orchestration service, that a security score of the client IHS is below a selected value.

The security score may be calculated, at least in part, based upon at least one of: a risk metric associated with a locale of the client IHS, a risk metric associated with a network of the client IHS, a risk metric associated with hardware of the client IHS, a risk metric associated with a requested datafile, or a regulatory risk metric.

The measurement data may be produced based, at least in part, upon at least one of: a firmware measurement or hash, a software measurement or hash, an SBOM, or a TPM quote. To attest the measurement data, the program instructions, upon execution, may cause the IHS to compare the measurement data against golden measurement data.

The program instructions, upon execution, may cause the IHS to request additional measurement data from the local management agent after the instantiation of the workspace. The program instructions, upon execution, may cause the IHS to transmit a command to the local management agent to tear down the workspace in response to the additional measurement data not matching golden measurement data.

In yet another illustrative, non-limiting embodiment, a method may include creating a workspace definition based upon measurement data received from a local management agent of an IHS in the absence of any identification of the IHS or any user of the IHS; and transmitting one or more files to the IHS, wherein the one or more files are configured to enable the local management agent to instantiate a workspace based upon the workspace definition.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

Figure 1:
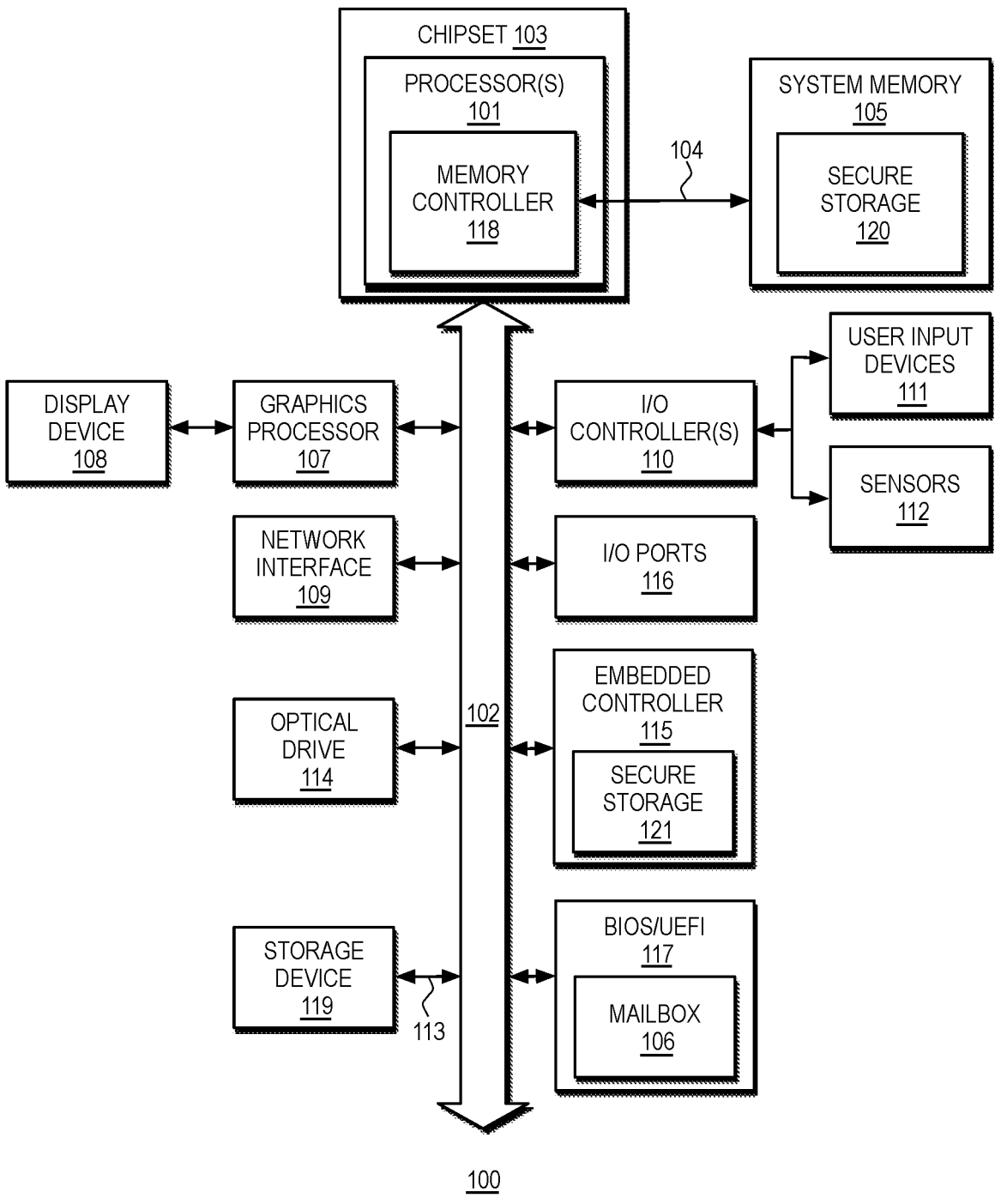
FIG. 1 is a diagram depicting illustrative components of an Information Handling System (IHS), according to various embodiments.

FIG. 1 is a diagram depicting internal components of IHS 100. In various embodiments, IHS 100 may be configured to implement systems and methods described herein. It should be appreciated that although certain implementations may be discussed in the context of a personal computing device, other implementations may utilize other types of IHSs.

As shown, IHS 100 may be employed to instantiate, manage, and/or terminate a workspace, such as a secure environment that may provide the user of IHS 100 with access to enterprise data while isolating the enterprise data from the operating system (OS) and other applications executed by IHS 100. The construction of workspaces for a particular purpose and for use in a particular context may be orchestrated remotely from IHS 100 by workspace orchestration services 206. In some embodiments, however, certain workspace orchestration operations may be performed locally on IHS 100.

IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

In this example, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes an integrated memory controller 118 that may be implemented directly within the circuitry of the processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 coupled to processor(s) 101 via memory bus 104 provides processor(s) 101 with a high-speed memory that may be used in the execution of computer program instructions by processor(s) 101. Accordingly, system memory 105 may include memory components, such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In some embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature or hash may be calculated based on contents of secure storage 120 and stored as a reference signature or hash. The integrity of the data stored in secure storage 120 may then be validated later by recalculating this signature of the contents of the secure storage and comparing the recalculated signature against the reference signature.

IHS 100 utilizes chipset 103 including one or more integrated circuits coupled to processor(s) 101. In this embodiment, processor(s) 101 is depicted as a component of chipset 103. In other embodiments, however, all of chipset 103, or portions of chipset 108 may be implemented directly within the integrated circuitry of processor(s) 101.

Chipset 103 provides processor(s) 101 with access to a variety of resources accessible via bus 102. In IHS 100, communication bus 102 is illustrated as a single element. However, other implementations may utilize any number of buses to provide the communication pathways served by bus 102.

A variety of resources may be coupled to processor(s) 101 of IHS 100 through chipset 103. For instance, chipset 103 may be coupled to network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH.

In certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from the OS of the IHS.

Chipset 102 may also provide access to one or more display device(s) 108 via graphics processor 107. In some embodiments, graphics processor 107 may be comprised within one or more video or graphics cards or an embedded controller installed as components of the IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS.

In some implementations, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

Chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.).

Chipset 103 may also include (or be coupled to) a sensor hub capable of utilizing information collected by sensors 112 in determining the relative orientation and movement of IHS 100. For instance, chipset 103 may employ the sensor hub to monitor inertial movement sensors, that may include accelerometer, gyroscope, and magnetometer sensors, and it may determine the current orientation and movement of IHS 100 (e.g., IHS 100 is motionless on a relatively flat surface, IHS 100 is being moved irregularly and is likely in transport, the hinge of IHS 100 is oriented in a vertical direction).

In certain embodiments, chipset/sensor hub 103 may also be configured to determine a location and movement of IHS 100 based on triangulation of network signal and based on network information provided by the OS or network interface 109. Chipset/sensor hub 103 may support additional sensors, such as optical, infrared and sonar sensors, which may provide support for Virtual, Augmented, and/or Mixed Reality (xR) sessions hosted by IHS 100, and/or may be used to obtain an indication of a user's presence near IHS 100, such as whether a user is present, absent, and/or facing the integrated display 108.

In cases where the end-user is present before IHS 100, chipset/sensor hub 103 may further determine a distance between the end-user and the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of the IHS 100 within a proximity of the IHS 100 may result in a change in the security profile of IHS 100, thus triggering a re-evaluation of the security risk of workspaces operating on IHS 100. Similar re-evaluation may be triggered based on the detection of additional individuals in proximity to IHS 100.

When IHS 100 supports multiple physical configurations or form factors, such as a convertible laptop, N-in-1 device, or the like, chipset/sensor hub 103 may collect readings from one or more sensors usable to determine the current posture in which the IHS 100 is physically configured.

Other components of IHS 100 may include one or more I/O ports 116 for communicating with peripheral external devices as well as various input and output devices. For instance, I/O 116 ports may include High-Definition Multimedia Interface (HDMI) ports for use in connecting external display devices to IHS 100 and Universal Serial Bus (USB) ports, by which a variety of external devices may be coupled to IHS 100.

In some embodiments, external devices coupled to IHS 100 via an I/O port 116 may include storage devices that support transfer of data to and from system memory 105 and/or storage devices 119 of IHS 100. As described in additional detail below, the coupling of storage devices via I/O port 116 may result in a change in the security profile of IHS 100, thus triggering a re-evaluation of the security risk of workspaces operating on IHS 100.

Chipset 103 also provides processor(s) 101 with access to one or more storage devices 119. In various embodiments, storage device 119 may be integral to the IHS 100 or may be external to the IHS 100. In certain implementations, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some cases, storage device 119 may be a system of storage devices, such as a cloud drive accessible via network interface 109.

As illustrated, IHS 100 also includes BIOS (Basic Input/ Output System)/Unified Extensible Firmware Interface (UEFI) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS/UEFI 117 instructions may also load an operating system for use by IHS 100. BIOS/UEFI 117 provides an abstraction layer that allows the OS to interface with the hardware components of IHS 100.

In the illustrated embodiment, BIOS/UEFI 117 includes a predefined memory or memory region that may be referred to as NVM (Non-Volatile Memory) mailbox 106. In such an implementation, mailbox 106 may provide a secured storage location for use in storing workspace access policies, signatures, cryptographic keys or other data utilized to host and validate a workspace on IHS 100. In certain embodiments, the BIOS mailbox 106 may be utilized as a secure storage utilized by a remote orchestration service to store access policies and cryptographic keys for use in delivering and deploying a secured container on IHS 100. BIOS mailbox 106 and secured storage 120 in system memory 105 may be utilized in this manner instead of, or in conjunction with, out-of-band functions implemented by trusted controller 115.

In certain embodiments, Embedded Controller (EC) 115 may be installed as a component of IHS 100. EC 115 may perform various operations in support of the delivery and deployment of a workspace to IHS 100. In certain embodiments, EC 115 may interoperate with a remote orchestration service via an out-of-band communications pathway that is isolated from the OS that runs on IHS 100. Network interface 109 may support such out-of-band communications between trusted controller 115 and a remote orchestration service.

EC 115 may receive cryptographic information required for secure delivery and deployment of a workspace to IHS 100. In such embodiments, the cryptographic information may be stored to secured storage 121 maintained by EC 115. Additionally, or alternatively, EC 115 may support execution of a trusted operating environment that may support cryptographic operations used to deploy a workspace on IHS 100. Additionally, or alternatively, EC 115 may support deployment of a workspace within the OS of IHS 100 via an out-of-band communications channel that is isolated from the OS and allows the workspace to communicate with a trusted agent process of the OS.

EC 115 may also provide support for certain cryptographic processing used to support secure deployment and operation of workspaces in IHS 100. In some embodiments, such cryptographic processing may be provided via operations of a secure operating environment hosted by EC 115 in isolation from the software and other hardware components of IHS 100. In some embodiments, EC 115 may rely on cryptographic processing provided by dedicated cryptographic hardware supported by the IHS, such as a Trusted Platform Module (TPM) microcontroller. In some embodiments, secure may be utilized to store cryptographic information for use in authorization of workspaces.

In certain embodiments, EC 115 may be additionally configured to calculate signatures that uniquely identify individual components of IHS 100. In such scenarios, EC 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such hash values may be calculated as part of a trusted process of manufacturing IHS 100 and may be maintained in secure storage 121 as a reference signature.

EC 115 may be further configured to recalculate a hash value later for such a component. The hash value recalculated for the component may then be compared against the reference hash value signature to determine if any modifications have been made to a component, thus indicating the component has been compromised. In this manner, EC 115 may be used to validate the integrity of hardware and software components installed on IHS 100.

In certain embodiments, remote orchestration service 206 may verify the integrity of the EC 115 in the same manner, by calculating a signature of EC 115 and comparing it to a reference signature calculated during a trusted process for manufacture of IHS 100. In various embodiments, one or more of these operations supported by EC 115 may be implemented using BIOS/UEFI 117.

EC 115 may also implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 115 may be used to operate a secure execution environment that may include operations for providing various core functions of IHS 100, such as power management and management of certain operating modes of IHS 100 (e.g., turbo modes, maximum operating clock frequencies of certain components, etc.).

IHS 100 may support the use of various power modes. In some embodiments, the power modes of IHS 100 may be implemented through operations of EC 115 and/or the OS of IHS 100. In various embodiments, IHS 100 may support various reduced power modes to reduce power consumption and/or conserve battery power when IHS 100 is not actively in use, and/or to control a level of performance available to the user by increasing or decreasing a maximum operating clock frequency of a component of IHS 100 (e.g., processor(s) 101).

In managing operating modes of IHS 100, EC 115 may implement operations for detecting certain changes to the physical configuration of IHS 100 and managing the modes corresponding to different physical configurations of IHS 100. For instance, where IHS 100 is a laptop computer or a convertible laptop computer, EC 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

In various embodiments, IHS posture determinations may be made using trusted controller or EC 115. For example, in laptop and convertible laptop embodiments, EC 115 may utilize a lid position sensor 112 to determine the relative angle between the two panels of the laptop to determine the mode in which IHS 100 is physically configured. In such embodiments, the lid position sensor may measure the angle of rotation of the hinge that connects the base panel and lid panel of IHS 100. In some embodiments, processor 101 or EC 115 may provide collected lid position information, such as the hinge angle, to chipset/sensor hub 103 for use in determining the posture in which IHS 100 is configured. In some embodiments, chipset/sensor hub 103 may interface directly with the lid position sensor in determining hinge angle information.

EC 115 may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture.

EC 115 may additionally utilize orientation and movement information collected from inertial movement sensors 112 to further determine the posture in which the IHS 100 is physically configured. For instance, if EC 115 determines that IHS 100 is configured with a hinge angle of a laptop configuration, but IHS 100 is oriented on its side, HIS 100 may be determined to be in a book mode. If IHS 100 is determined to be tilted such that the hinge is oriented between horizontal and vertical, the user's face is detected to be facing the integrated display, and IHS 100 is experiencing slight movement, EC 115 may determine that the IHS 100 is being used in a book posture. If EC 115 determines that IHS 100 is opened to a 180-degree hinge angle and lies on a flat surface, it may detect that IHS 100 is being used in a landscape posture. Similarly, EC 115 may determine that IHS 100 is in a tent configuration in response to detecting a hinge angle within a defined range, such as between 300 and 345 degrees, where the hinge is aligned horizontally and is higher than both display panels of IHS 100.

Generally, IHS 100 may support the operation of one or more workspaces, each operating using resources of IHS 100 that are specified within a respective workspace definition, where an individual workspace provides operation of software programs and access to protected data in varying degrees of isolation from the OS of IHS 100 and from other workspaces.

An individual workspace may be hosted by IHS 100 using various combinations of the described software and hardware resources of the IHS. In some instances, a workspace may be configured to operate as a type of virtual machine (VM) that runs in isolation from the OS of the IHS 100, but that relies on certain shared software libraries and other resources of the IHS 100. In other instances, a workspace may operate as a different type of VM that not only runs in isolation from the OS, but also does not share any libraries and operates using a segregated portion of memory 105.

In some instances, a workspace may operate as a container application that runs within the OS of the IHS 100, but that provides a segregated computing environment in which applications and data that are accessed via the container are not otherwise accessible by other programs or containers hosted by the OS. In other instances, a workspace may operate within the OS of IHS 100 as a web-browser application that runs using libraries and other resources utilized by the web browser. In yet another instance, a workspace may be configured to operate such that a graphical interface for the workspace is displayed in display device 108, but the workspace operates in full or in part in a cloud resource, thus isolating certain aspects of the workspace entirely from IHS 100.

In some embodiments, an IHS 100 may not include all the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
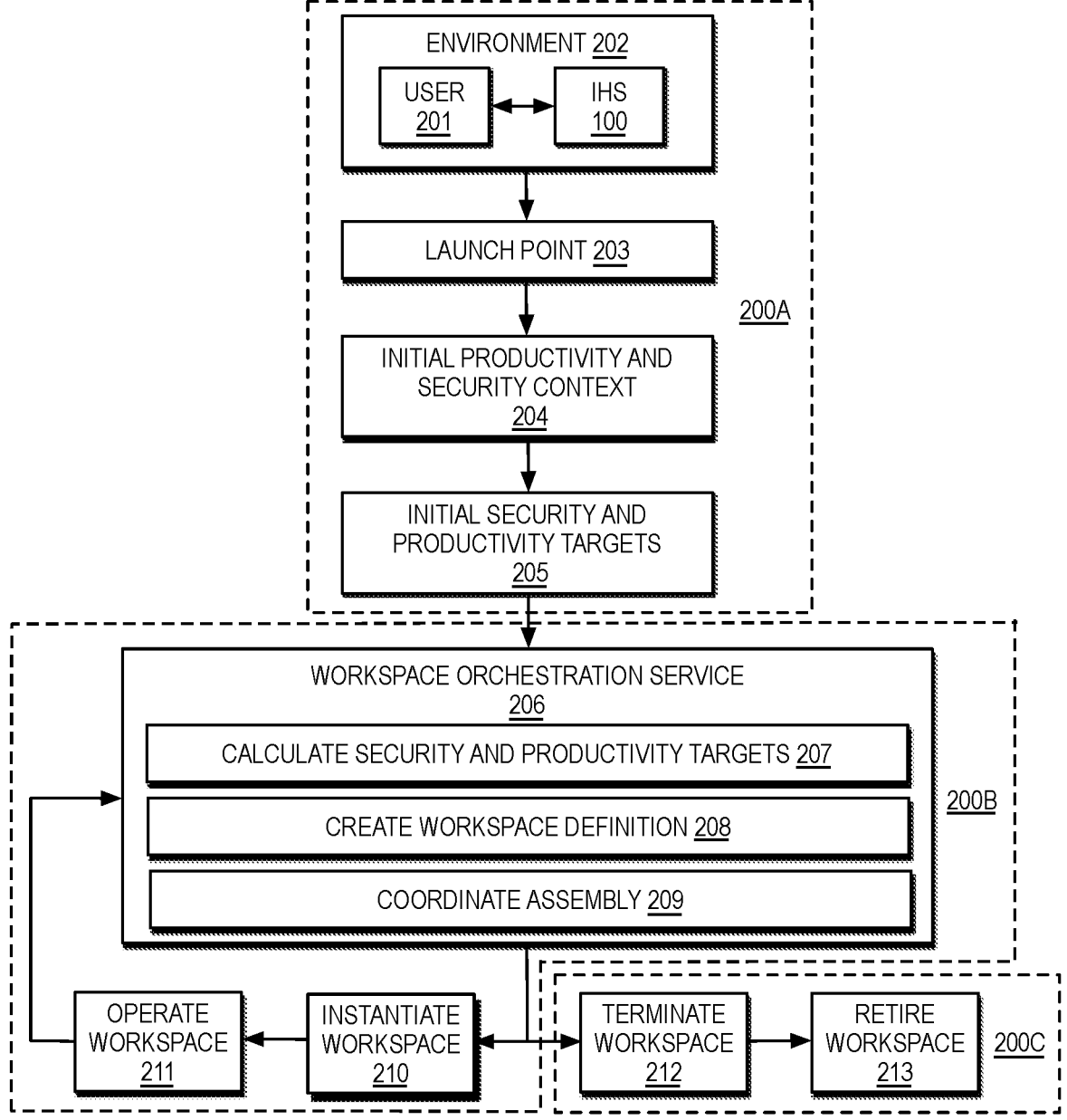
FIG. 2 is a diagram depicting a method for orchestrating the deployment and operation of workspaces, according to various embodiments.

FIG. 2 is a diagram depicting an example of method 200 for orchestrating the deployment and operation of workspaces. For ease of explanation, method 200 has been split into three phases: workspace initialization phase 200A, workspace orchestration phase 200B, and workspace termination phase 200C. During initialization 200A, user 201 (e.g., an enterprise user) operates IHS 100 (e.g., a desktop, a laptop, a tablet, a smart phone, etc.) within physical environment 202 (e.g., any type of environment and its associated context, including physical location, geographic location, location within a particular facility, building, or office, detected networks, time of day, proximity of the user, individuals in the vicinity of IHS 100, etc.).

Method 200 starts with an action by user 201 at launch point 203 which may be, for example, a corporate launch point provided by an employer of user 201, by the manufacturer of IHS 100, or a third-party service. For example, launch point 203 may be implemented in the form of a web portal, a portal application running in the OS of IHS 100, a special-purpose portal workspace operating on IHS 100, or the like.

In various implementations, launch point 203 may include Graphical User Interface (GUI) elements representing different software applications, data sources and/or other resources that the user may desire to execute and/or manipulate. Launch point 203 may provide a graphical, textual and/or audio interface by which data or other resources may be requested by user 201. Once authenticated, launch point 203 provides user 201 with visibility as to one or more software applications and an aggregation of user's data sources available across multiple datastores (e.g., local storage, cloud storage, etc.).

In various embodiments, launch point 203 may be provided in the form of a portal (e.g., a webpage, OS application or special purpose workspace) that allows user 201 to request access to managed resources. In various embodiments, launch point 203 may be hosted by remote workspace orchestration service 206 and/or local management agent 332. Examples of launch point 203 technologies may include WORKSPACE ONE INTELLIGENT HUB from WMWARE, INC., and DELL HYBRID CLIENT from DELL TECHNOLOGIES INC., among others.

Initialization phase 200A begins when user 201 chooses to launch an application or access a data source managed by workspace orchestration service 206. In response to an access request issued by user 201 (e.g., the user "clicks" on an icon of launch point 203), local management agent 332 collects initial security and productivity context information at 204.

The term "security context," as used herein, generally refers to data or other information related to a security posture in which a workspace will be deployed and utilized, where the security posture may be based on user 201, IHS 100, data to be accessed via the workspace, and/or environment 202.

Security context information may include attributes indicating a security risk associated with: the data and/or application being requested, a level of risk presented by the user 201, the hardware utilized by the IHS 100, the logical environment of IHS 100 in which a workspace will be deployed to provide access to the requested data and/or application, and the physical environment 202 in which IHS 100 is currently located.

A security context may be quantified as a security risk score in support of evaluations of the level or risk associated with providing user 201 access to requested data and/or application while using IHS 100 in the particular context. A "security risk score" generally refers to a numerical value usable to score, quantify, or measure various security characteristics of the security context associated with a request. A risk score may be an aggregate score associated with the overall security risk context, whereas a "risk metric" may be a measurement of risk for a sub-category of some part of the security context.

Security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, Indicators of Attack (IoA), Indicators of Compromise (IoC) regarding IHS 100 or a resource being requested by user 201, patch levels associated with the OS and other applications in use, availability of encryption, type of available encryption, access to secured storage, use of attestable hardware by IHS 100, supported degree of workspace isolation by IHS 100, etc.

The term "productivity context" generally refers to user productivity associated with a workspace, user, IHS, or environment. A "productivity score" generally refers to an index usable to score, quantify, or measure various productivity characteristics of a productivity context. Examples of productivity context information include, but are not limited to: the hardware of the IHS, the software of the IHS, including the operating system, power states and maximum clock frequencies of selected components of the IHS, peripheral devices coupled to the IHS, either permanently or temporarily, networks available to the IHS and the performance characteristics of those networks, software installers available on the IHS, etc.

At 205, initial productivity and security targets for a workspace may be calculated based on the context of user's 201 actions combined with the productivity and security context in which the workspace will operate. The productivity and security targets may also be based on user's 201 behavioral analytics, IHS 100 telemetry and/or environmental information (e.g., collected via sensors 112). In some cases, at 205, a local management agent operating on IHS 100 may calculate initial security and productivity targets based upon the collected security and productivity context. In other cases, remote workspace orchestration service 206 may calculate security and productivity targets.

As used herein, the term "security target" generally refers to the attack surface presented by a workspace that is created and operated based on a workspace definition, while the term "productivity target" generally refers to the productivity characteristics of a particular workspace definition. Examples of a productivity target include, but are not limited to: type of data or data source available to user 201, minimum latency of a workspace, etc. Conversely, attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from IHS 100, the ability to access browser within a workspace, the ability to transfer data between workspaces, the ability to extend a workspace, etc.

Workspace orchestration phase 200B begins as workspace orchestration service 206 calculates security and/or performance/productivity targets 207, produces and/or modifies workspace definitions 208, and coordinates the assembly 209 and/or instantiation 210 of workspaces.

The term "workspace definition" generally refers to a collection of attributes that describe aspects a workspace that may be assembled, created, and deployed in a manner that satisfies a security target (i.e., the definition presents an attack surface that presents an acceptable level of risk) and a productivity target (e.g., data access, access requirements, upper limits on latency, etc.) in light of the security context (e.g., location, patch level, threat information, network connectivity, etc.) and the productivity context (e.g., available device type and performance, network speed, etc.) in which a workspace is to be deployed.

Workspace definition 208 may enable fluidity of migration of an instantiated workspace since the definition supports the ability for a workspace to be assembled on any target OS or IHS that is configured for operation with the workspace orchestration service 206.

In describing capabilities and constraints of a workspace, workspace definition 208 may prescribe one or more of: authentication requirements for user 201, containment and/or isolation of the workspace (e.g., local application, sandbox, docker container, progressive web application or "PWA," Virtual Desktop Infrastructure "VDI," etc.), primary applications that may be executed in the defined containment of the workspace to enable user 201 to be productive with one or more data sources, additional applications that enhance productivity, security components that reduce the scope of the security target presented by the productivity environment (DELL DATA GUARDIAN from DELL TECHNOLOGIES INC., an anti-virus, etc.), the data sources to be accessed and requirements for routing that data to and from the workspace containment (e.g., use of VPN, minimum encryption strength), workspace capabilities to independently attach other resources; etc.

In some implementations, workspace definition 208 may be created based at least in part on policies or rules defined, for example, by an enterprise's Information Technology (IT) personnel. In some implementations, rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206 may autonomously add that application to the default workspace definition for that user.

During orchestration 200B, initial security and productivity targets 205 are processed and/or reconciled against resources, device capabilities, and cloud services available, etc., to create workspace definition at 208. Workspace definition 208 may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace once running, applications to be provided for operation within the workspace, aggregation of resources available via the workspace, access configurations (e.g., virtual private network or "VPN"), etc.

The initial workspace definition may then be utilized by automation engine 302 of workspace orchestration service 206 to coordinate the assembly 209 and instantiation 210 of a workspace on an appropriate platform—e.g., on the cloud or on IHS 100—based on the security and productivity contexts in which the workspace or components thereof will operate. Workspaces configured to provide user 201 with access to requested data or other resources may be instantiated using local management agent 332.

In cases where a workspace or at least one of its components is cloud-hosted, automation engine 302 may assemble and instantiate a remote workspace that may be accessed via a secure connection established via a web browser or other web-based component operating on IHS 100. In some embodiments, automation engine 302 may resolve configuration conflicts between a workspace definition and the user's inputs in the operation of a workspace.

The instantiated workspace is operated by user 201 at 211, and new productivity and security context information related to the behavior or use of data is generated. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation of the security and performance targets at 207 by automation engine 302. Additionally, or alternatively, new workspace context, security target, and/or productivity target may be now measured against the initial targets, and the result may cause automation engine 302 to produce a new workspace definition at 208, if appropriate. Particularly, if the instantiated workspace(s) have parameters that fall outside of the range of the target indexes such that a difference between additional or updated context information and the initial or previous context information is scored below a threshold value, automation engine 302 may process the assembly of modifications to an existing workspace definition at 208 and deploy such modifications at 209. Conversely, if the difference between the additional or updated context information and the initial or previous context information is scored above a threshold value, automation engine 302 may generate a new workspace definition at 208. Session data metadata and context may be preserved by data aggregation engine 336, and session data may be restored as applicable.

In termination phase 200C, method 200 may terminate the workspace at 212 and retire it at 213. In some cases, user action may initiate the termination process (e.g., user 201 closes application or browser accessing data) and/or termination may take place automatically as part of an adjustment in workspace definition (e.g., the isolated environment is instructed to terminate by automation engine 302). Still as part of termination phase 200C, workspace resources of IHS 100 and/or at workspace orchestration service 206 may be released.

As such, in various embodiments, method 200 enables secure user productivity even when a workspace operates on an IHS or cloud platform that is not under direct management. Method 200 also provides for dynamic or adaptive configurations and policies allowing for the best possible user experience while maintaining an appropriate level of security. In some cases, the definition of a productivity environment and access requirements may be selected based upon productivity and security dependencies and targets, and the definition of capabilities related to the workspace may be adaptive in nature. Particularly, workspace definition attributes may be dynamically selected based upon historical productivity and security information, based upon each individual user or group's behavior.

Figure 3A:
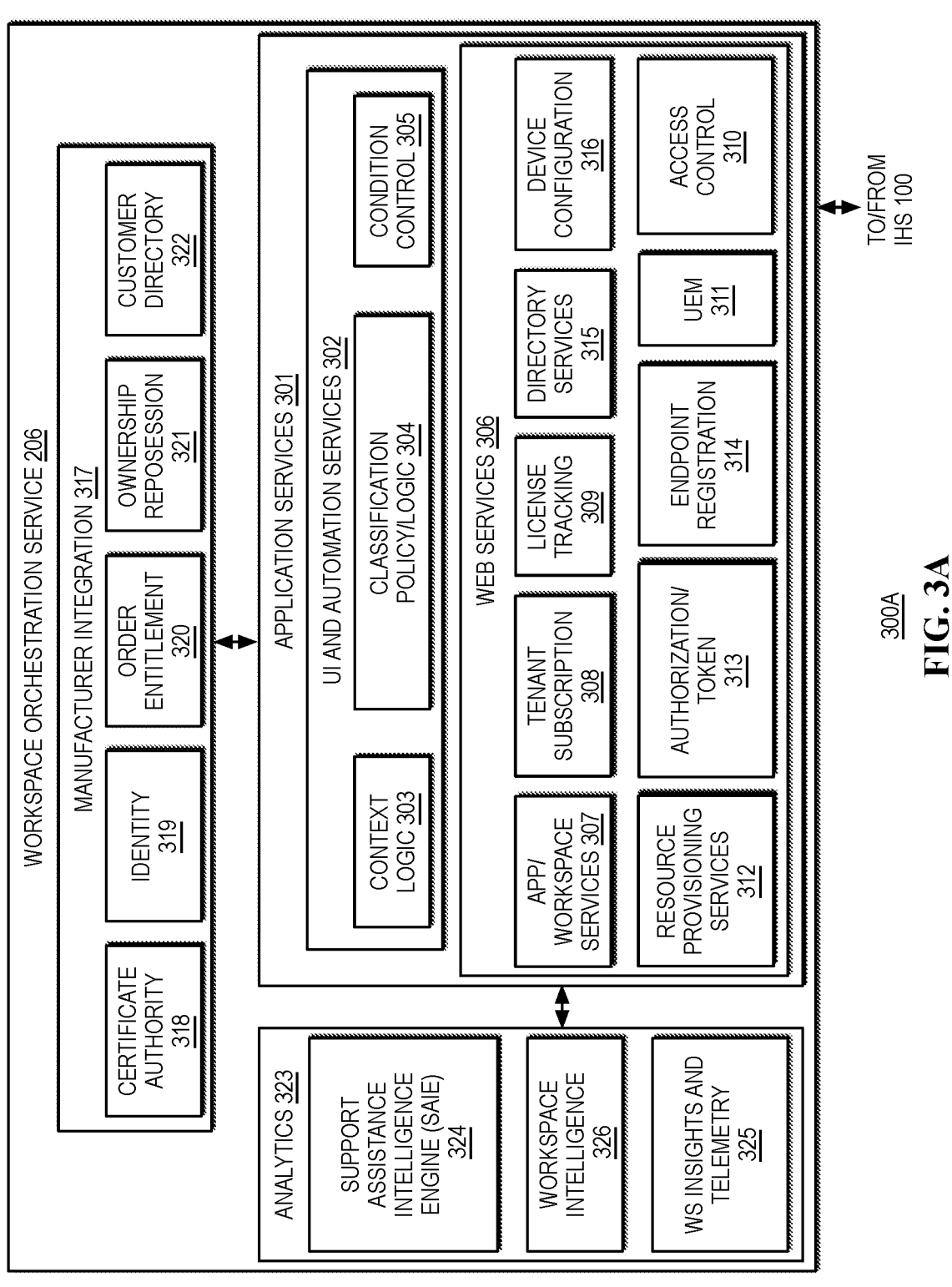
FIGS. 3A and 3B are diagrams depicting an example of a system configured for deploying and operating workspaces, according to various embodiments.
Figure 3B:
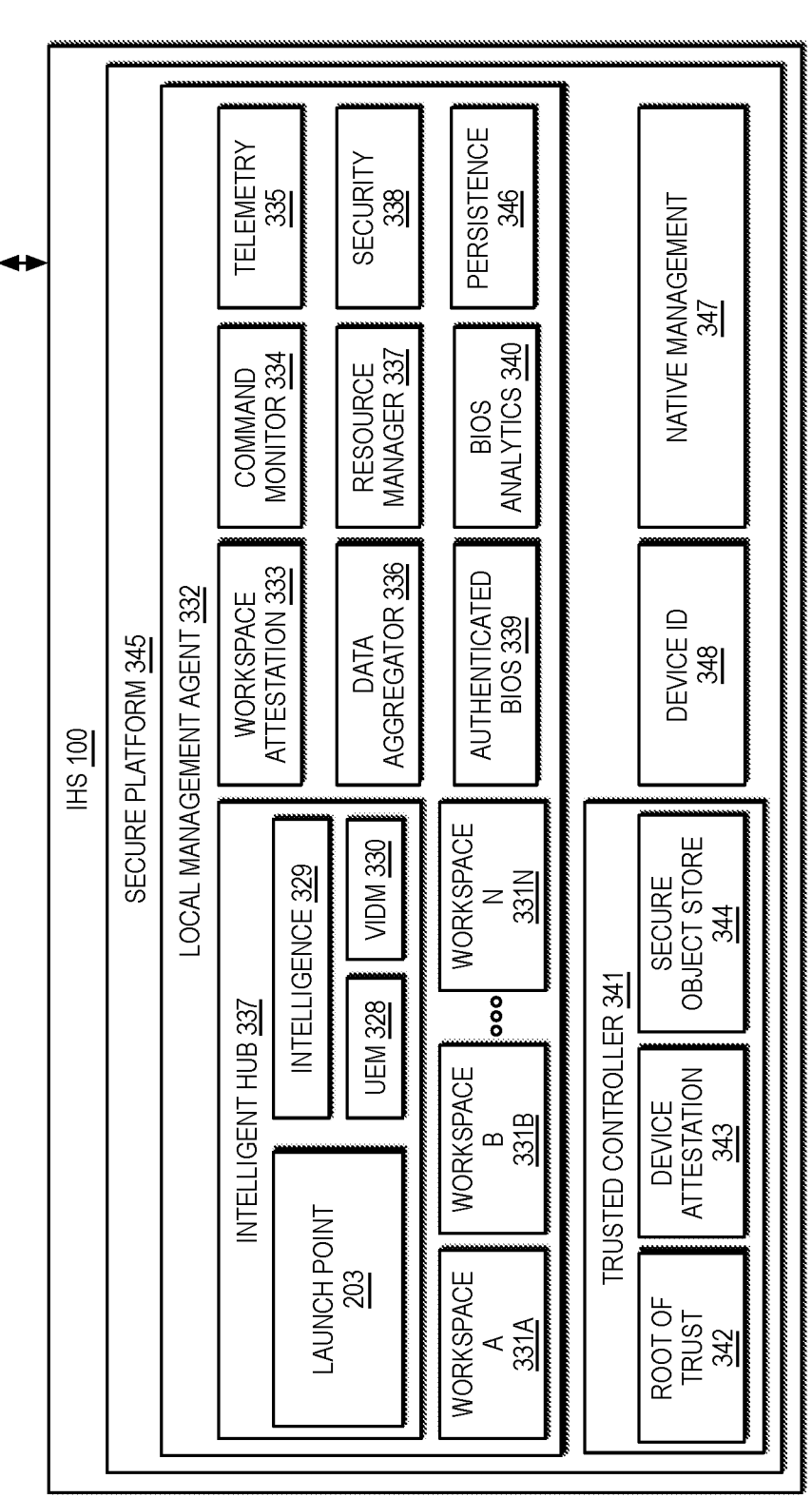

FIGS. 3A and 3B show diagrams of an example of components 300A and 300B (collectively referred to as "system 300") configured for deploying and operating workspaces. Particularly, component 300A comprises workspace orchestration service 206, and may include one or more IHSs remotely located and/or networked having program instructions stored thereon that, upon execution, cause the one or more IHSs to perform various workspace orchestration operations described herein, including, but not limited to: the dynamic evaluation of security and productivity targets based upon updated context information received from IHS 100, the calculation of risk scores and other productivity and security metrics based on ongoing collection of context information, the generation of workspace definitions, and the assembly of one or more files or policies that enable the instantiation of a workspace in accordance with a workspace definition at a cloud service and/or IHS 100.

Component 300B includes IHS 100 configured with program instructions stored thereon that, upon execution, cause IHS 100 to perform various local management operations described herein, including, but not limited to, the collection of productivity and security context information, the calculation of productivity scores and/or risk scores, the instantiation, execution, and modification of a workspace based upon files or policies, such as workspace definitions, received from workspace orchestration service 206, etc.

Components 300A and 300B may be coupled to each other via any suitable network technology and/or protocol, which allows workspace orchestration service 206 to be remotely provided with respect to component 300B. As described above, IHS 100 of component 300B may include EC 115, which may support certain secure out-of-band communications independent from the OS of IHS 100. In some embodiments, EC 115 may be configured to support deployment and operation of workspaces on IHS 100 and to report changes in context information to component 300A.

In component 300A, workspace orchestration service 206 may include several sub-components that support deployment and ongoing evaluation and adaptation of workspaces on component 300B. Particularly, workspace orchestration service 206 includes application services 301 having User Interface (UI) and automation services 302 and web services 306, as well as manufacturer integration services 317, and analytics services 323.

Analytics services 323 may be configured to receive and process context information from IHS 100, both during initial configuration of a workspace and in ongoing support of workspaces, and to provide that information, along with any analytics generated, to context logic 303. Based on information collected during the deployment and ongoing support of workspaces, support assistance intelligence engine (SAIE) 324 may be configured to generate and/or analyze technical support information (e.g., updates, errors, support logs, etc.) for use in diagnosing and repairing workspace issues. Workspace insights and telemetry engine 325 may be configured to analyze and/or produce device-centric, historical, and behavior-based data (e.g., hardware measurements, use of features, settings, etc.) resulting from the operation of workspaces. Workspace intelligence 326 may include any suitable intelligence engine for processing and evaluating context data to identify patterns and tendencies in the operation of workspaces and in the adaptation of workspaces based on context changes.

UI and automation services 302 may include context logic or engine 303, classification policy 304, and condition control module or engine 305. Context logic or engine 303 may support processing of context information in making risk assessments (e.g., evaluating the risk associated requests by the user against the context of the user's behavior, history of the user's IHS, capabilities of the user's IHS, and environmental conditions).

For instance, security context information collected by IHS 100 may be provided to workspace orchestration service 206 where it may be used, such as by context logic 303, to calculate a risk score associated with a request for use of a managed data source and/or application.

Classification policy 304 may include administrator and machine-learning defined policies describing risk classifications associated with different security contexts, such as risk classifications for specific data, locations, environments, IHSs, logical environments, or user actions (e.g., use of high-risk data requires use of a workspace definition suitable for use with a risk score above a specific value).

Condition control module or engine 305 may include intelligence providing automated decision making for appropriately aligning risk and context. In some cases, condition control module or engine 305 may dynamically deploy a solution to address any detected misalignment of risk and context. For instance, upon requesting access to a highly classified data source that results in a significant increase in risk score, the condition control engine may select workspace definition modifications that implement security procedures suitable for the higher risk score.

Application services 301 may include a group of web services 306 called on by UI and automation services 302 to support various aspects of the orchestration of workspaces. Particularly, web services 306 may include application and workspace services 307 that may assemble and package applications for deployment in a workspace (e.g., an ".msix" file packaged and deployed to a MICROSOFT HYPER-V container).

In some embodiments, a workspace definition may be used to specify whether a user will be provided access to an application in this manner. Web services 306 may also include tenant subscription module 308 that performs dynamic configuration of an IHS and deployment of the described workspace orchestration services at the Point-of-Sale (POS) of an IHS.

License tracking module 309 may be used to maintain and track license information for software, services, and IHSs.

Access control module 310 may provide top level access controls used in controlling access to data and applications by authorized users.

Unified Endpoint Management (UEM) module 311 may be configured to support the described orchestration of workspaces on various IHSs that may be utilized by a particular user.

Web services 306 that may be used in support of workspaces may further include resource provisioning services 312 for configuring an IHS or workspace with secrets/credentials necessary to access specific resources (e.g., credentials for use of VPNs, networks, data storage repositories, workspace encryption, workspace attestation, and workspace-to-device anchoring).

In some cases, resource provisioning services 312 may include secrets provisioned as part of a trusted assembly process of IHS 100 and, in some instances, associated with a unique identifier 348 of IHS 100 (e.g., service tag, serial number, etc.).

Web services 306 may also include an authorization/token module that provides identity functions and may connect to various authentication sources, such as, for example, Active Directory.

Endpoint registration module 314 may be configured to register IHSs and/or workspaces with management service that tracks the use of the described workspace orchestration.

In some scenarios, directory services module 315 may be configured to provide active directory services (e.g., AZURE ACTIVE DIRECTORY from MICROSOFT CORPORATION).

Device configuration services 316 enable central configuration, monitoring, managing, and optimization of workspaces that in certain contexts may operate remotely from an IHS and may only present the user of the IHS with an image of the workspace output. In cooperation with resource provisioning services 312, device configuration services 316 may also handle secret creation and IHS configuration and, in some cases, may be out-of-band capable and handle selected operations to the endpoint.

Still referring to FIG. 3A, manufacturer integration components 317 communicate with application services 301 and client IHS 100 to provide features that are usable during workspace evaluation and instantiation, where these features are based upon information available to the manufacturer of client IHS 100.

For instance, certificate authority 318 may include an entity that issues digital certificates that may be used in validating the authenticity and integrity of the hardware.

Identity service module or engine 319 may be configured to manage the user's or owner's identity as well as brokering identification for use of customer directory 322.)

Order entitlement module or engine 320 may be responsible for managing the entitlements purchased as well as the associated issued certificates signed by 318.

Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS.

Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to component 300B of FIG. 3B, IHS 100 may be configured to operate local management agent 332 that may run within secure execution environment 345 hosted by a trusted controller 341, such as EC 115 of FIG. 1. In other embodiments, local management agent 332 may operate as a trusted and attestable process of the OS of IHS 100.

In some embodiments, local management agent 332 may include a workspace engine suitable for instantiating and managing the operation of one or more workspaces 331A-N on IHS 100. As described, the capabilities of a workspace may be modified based on changes in the productivity and security contexts in which the workspace is operating.

Accordingly, the workload(s) in each of the workspaces 331A-N may be hosted in a public cloud, a private cloud, a specific server, or locally hosted on IHS 100, depending on the context in which the workspace is operating.

These allocations of workspace computing for each workspace 331A-N may be prescribed by the workspace definition that is used to build and operate each workspace. As described, the workspace definition may be created by workspace orchestration service 206 based upon context information provided by IHS 100, security targets for each workspace 331A-N, and productivity targets for each workspace 331A-N.

In some embodiments, local management agent 332 may be configured to host, launch, and/or execute workspace hub 327 that provides launch point 203 by which user's initiate workspaces through the selection of managed data and resources. In various embodiments, launch point 203 may be an agent, application, special-purpose workspace or web portal the provides an interface by which a user may select from an aggregated collection of data sources, applications, calendars, messages or other managed information or resources that are available to the user of IHS 100 via operation of a workspace as described herein.

In various embodiments, launch point 203 may be provided in the form for textual, graphical and/or audio user interfaces that allow a user of IHS 100 to select available data and/or resources. In some embodiments, workspace hub 327 may utilize local environment management module 328 in providing the workspace interface that is presented to the user on IHS 100 and doing so in a consistent manner across workspaces 331A-N.

Workspace hub 327 may also include a local intelligence logic or engine 329 used to support modeling the use of IHS 100 to improve characterization of the actual risk associated with a risk context. User authentication and access control operations may be performed by local identify module 330 that may interface with trusted controller 341 in providing user authentication.

In some cases, each instantiated workspace 331A-N may be an environment that provides a user with access to requested data or applications, where the environment may be isolated in varying degrees from the hardware and software of IHS 100 based on the security context and productivity context in which each workspace 331A-N is operating. In some instances, the selection of a data source or resource that is available to user via launch point 203 may result in launching a new workspace.

For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user double clicks on a confidential presentation file available from a data source that is provided by launch point 203, an additional workspace may be instantiated with a presentation application providing access to the requested presentation file, where this new workspace is created based on a workspace definition that provided appropriate security for access to the confidential presentation).

In other instances, a selection of the presentation file by a user may result in the presentation being made available through the existing workspace, in some cases using the existing workspace definition and, in other cases, using a workspace definition that has been modified to support the requested access to the confidential presentation file.

Although workspaces 331A-N supported by IHS 100 may each be isolated to varying degrees from the hardware and/or software of IHS 100 and from each other, a user of IHS 100 may expect to be able to operate the multiple workspaces 331A-N in a manner that allows content to be transferred between the different workspaces 331A-N. For instance, a user may select a portion of the data displayed in workspace 331A and utilize operating system or other workspace functions to copy the data for copying to workspace 331B.

In various embodiments, local management agent 332 may operate in full or in part on secure platform 345 hosted by trusted controller 341 that operates independent from the OS of IHS 100. In some embodiments, all or part of local management agent 332 may operate as trusted components of the operating system of IHS 100.

To execute the various operations described herein, local management agent 332 may include command monitor 334 configured to provide instrumentation to receive commands from workspace orchestration service 206 and thus enable access to IHS 100. Local management agent 332 may also include telemetry module 335 configured for communicating collected information to the workspace orchestration service 206, including reporting changes in context that may warrant adjustments to workspaces 331A-N. Data aggregator 336 may track all data sources and other resources (e.g., applications, local or cloud-based services) provided to the user via a workspace.

Local management agent 332 may utilize resource manager module 337 that is configured to manage access to data, network configuration, such as for VPNs and network access, identity information, access control, and resource provisioning services.

Security module 338 may be configured to provide various security services.

BIOS interface 339 may provide a secure BIOS interface used for accessing and managing credentials in secure object storage.

BIOS analytics module 340 may be configured to perform forensic services for BIOS telemetry and health assessments.

Persistence module 346 may be configured to support persistence of applications entitled at a POS or assigned by administrators and supported with required license tracking.

Workspace attestation module 333 may provide a platform centric service layer on top of a container engine provided by local management agent 332, and may be used to measure and attest workspaces 331A-Nin any suitable manner defined or orchestrated by condition control 305.

As part of secure platform 345, native management module 347 may be configured to enable out-of-band management interface with workspace orchestration service 206, where this OOB interface operates independent form the OS of IHS 100. In some embodiments, the OOB management interface supported by native management module 347 may be utilized by device configuration services 316 of workspace orchestration 206 service to access the secure platform services 345 of IHS 100.

Digital device ID module 348 may provide a unique, unspoofable, cryptographically bound identifier. In embodiments supporting secure platform 345, secure embedded controller 341 may be a hardened hardware module that may include root of trust module 342 configured as a trusted data store and, in some cases for cryptographic processing, that may be trusted within a cryptographic system.

Device attestation service 343 may be configured to perform device assurance and trust services (e.g., secure BIOS and secure boot, etc.). Secure object store 344 may be provided that is configured to lock and access keys, hashes, and/or other secrets in an EC and/or Trusted Platform Module (TPM).

In deployments where IHS 100 may be provisioned by a manufacturer that also controls manufacturer integration components 317, workspace attestation module 333 may operate in conjunction with secure object store 342, authenticated BIOS module 339, and/or digital device identity module 348, etc., to further secure and/or control productivity features available in any of workspaces 331A-N based upon hardware devices and settings unique to that IHS and/or designed specifically by that manufacturer.

To further illustrate how systems and methods described herein operate to modernize workspace and hardware lifecycle management in an enterprise productivity ecosystem, non-limiting use-cases or examples are discussed in turn below.

A First Use Case

In a first use case, a given user may request access to a protected data source on the enterprise's premises using a corporate-owned and imaged notebook configured as IHS 100.

In response to the request, local management agent 332 operating on the user's notebook retrieves information describing the current context and calculates security and productivity targets based on the determined context. In this use case, local management agent 332 may have been installed by IT, and it may be running in the background as a service.

The confidential data may be associated with local management agent 332 on HIS 100, based on file classification (e.g., file metadata/type/properties/permissions, folder location, encrypted region, etc.). Moreover, local management agent 332 may continuously collect current context information and send it to workspace orchestration service 206 for use in scoring the risk and productivity of the workspace (this may also be done at the time of the user's access request or indication of intent).

When the user selects the confidential data, such as via a selection via the OS of HIS 100, local management agent 332 notifies workspace orchestration service 206 of the request and for a workspace definition for a workspace by which the user may be provided access to the confidential data.

In this example, workspace orchestration service 206 may score an overall security risk to have a value of "2," using a weighed, machine learning, or artificial intelligence algorithm, based upon the following context information or inputs, each of which is also given as a risk metric based upon a selected policy: locale: 1 (safe locale); user persona: 1 (known high-confidence in a reasonably sophisticated user classification-a user whom historically does not click on phishing emails); network risk: 1 (low risk because of on premise, wired connection detected); device risk: 1 (high level of control because of corporate owned/managed platform, known versions, security features enabled, etc.); regulatory: 1 (based on user, data, location combinations—e.g., No restrictions with respect to General Data Protection Regulation or "GDPR," Health Insurance Portability and Accountability Act "HIPAA," Payment Card Industry "PCI," technology export, etc.); and data type: 8 (a confidential datafile is being requested).

Workspace orchestration service 206 may also calculate a productivity score to have a value of "9," using a weighed, machine learning, or artificial intelligence algorithm, based upon the following context information or inputs, each of which is also given as a resource metric based upon a selected policy: locale: 10 (office); user persona: 9 (a "skilled" classification based upon advanced compute tasks, proficiency, and/or speed); network speed/latency: 10 (fast, wired, Gigabit Ethernet, or direct to internal network); device performance: 8 (fast, expensive CPU, memory, graphics, but storage only needs—e.g., <10 GB); and data type: 10 (the local, confidential file is easy to read/write with low latency and high performance on local storage).

Second, based upon the security score and/or context information, workspace orchestration service 206 builds a workspace definition having any suitable structure with workspace definition attributes in a machine-readable format (e.g., JSON name-value, XML structured, etc.). In this example, the security target may be deemed to have a value of "1" based upon a combination of attributes values representing loads, needs, or demands on security controls and containment features that may include: threat monitoring: 1 (low demand); threat detection: 1 (low demand); threat analytics: 1 (low demand); threat response: 1 (low demand); storage confidentiality: 2 (low); storage integrity: 2 (low); network confidentiality: 1 (low); network integrity: 1 (low); memory confidentiality: 1 (low); memory integrity: 1 (low); display confidentiality: 1 (low); display integrity: 1 (low); user authentication: 1 (low, basic password is fine, nonmultifactor authentication or "MFA," no session expiration); IT administrator scope: 1 (administrator manages remotely but does not need heavy remediation software; and regulatory compliance: 1 (no GDPR, No HIPAA, no PCI, no tech export restriction, etc.).

Based upon the productivity target and/or context information, a productivity target for the workspace definition may be deemed to have a value of "9" (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 10 (can use applications, install applications that the user needs, give them administrator rights, etc.).

Third, after the workspace definition is complete, workspace orchestration service 206 and local management agent 332 may assemble the workspace and instantiate it for the user. For example, local management agent 332 may receive definition files (e.g., JSON, XML, etc.) from workspace orchestration service 206, and it may parse the file to implement security risk controls such as: threat monitoring: 1 (local management agent does not install threat, detection, and response or "TDR" software); threat detection: 1 (local management agent does not install TDR software); threat analytics: 1 (orchestration does not need to gather detailed telemetry from the system, OS will not be enrolled in logging); threat response: 1 (local management agent does not install security threat response agent); storage confidentiality: 2 (local management agent deploys a local file-system encryption product that the user can optionally enable on specific files as needed with right-click context menus); storage integrity: 2; network confidentiality: 1 (local management agent confirms basic firewall configuration is correct—e.g., IT GPO-controlled); network integrity: 1; memory confidentiality: 1 (local management agent confirms configuration—e.g., No SGX, TXT, or container/sandbox software deployed); memory integrity: 1; display confidentiality: 1 (local management agent confirms graphics drivers installed, privacy screen and camera optionally managed by user); display integrity: 1; user authentication: 1 (local agent confirms basic GPO password rules are configured, and met by user—e.g., number of characters, no session expiration, etc.); IT administrator scope: 1 (local agent runs with system privilege, confirms IT admin accounts are listed in local admin user group—e.g., per GPO); and regulatory compliance: 1 (local agent does not install any compliance assistance software).

After confirming the configuration, workspace orchestration service 206 and local management agent 332 may give the user access to the requested local confidential file, and the user may begin working in a newly created workspace.

A Second Use Case

In a second use case, a user may request access to a confidential datafile while at a coffee shop using an open public network and an IT-managed/owned PC configured as IHS 100.

First, local management agent 332 executed by client IHS 100 retrieves the requested context and calculates security and productivity scores based on context. In this use-case, local management agent 332 may have been installed by IT, and it may be running in the background as a service. The confidential data may be kept on a shared IT-managed network resource on-premises (e.g., back in a main corporate office), and local management agent 332 may be responsible for monitoring when this data path is requested by the user (e.g., the user hits a specific URL, IP, etc.). Moreover, local management agent 332 may continuously collect all current context and send it to workspace orchestration service 206 to assist in scoring processes later (this may also be done at the time of the user's access request or indication of intent, rather than a continuous collection).

When the user selects the desired confidential datafile, the HIS 100's OS calls local management agent 332 associated with the path to the confidential datafile and calls back to workspace orchestration service 206 to request a workspace definition.

In this example, workspace orchestration service 206 may score an overall security risk to have a value of "4," using a weighed, machine learning, or artificial intelligence algorithm, based upon the following context information or inputs, each of which is also given as a risk metric based upon a selected policy: locale: 5 (public, safe country); user persona: 5 (new user, classification data does not exist yet); network risk: 5 (medium, public but common location, wireless connection detected); device risk: 1 (high level of control, corporate owned/managed platform, known versions, security features enabled, etc.); and regulatory: 1 (based on user, data, location combinations—e.g., no restrictions with respect to General Data Protection Regulation or "GDPR," Health Insurance Portability and Accountability Act "HIPAA," Payment Card Industry "PCI," technology export, etc.).

Workspace orchestration service 206 may also calculate a productivity score to have a value of "5," using a weighed, machine learning, or artificial intelligence algorithm, based upon context information or inputs, each of which is also given as a resource metric based upon a selected policy. For instance, security contexts inputs may include: locale: 6 (remote location but in USA major city, in a public area, non-employees are within visual/audio range of device); user persona: 5 (unknown confidence "null" classification, uses default onboarding assumptions); network speed/latency: 4 (medium, wireless but AC on shared network); and device performance: 8 (fast, expensive CPU, memory, graphics, but storage only needs ~<10 GB).

Second, based upon the security score and/or context information, workspace orchestration service 206 builds a workspace definition having any suitable structure with workspace definition attributes in a machine-readable format (e.g., JSON name-value, XML structured, etc.). In this example, a security target may be deemed to have a value of "4" based upon a combination of attributes values representing loads, needs, or demands on security controls and containment features as follows: threat monitoring: 4 (medium demand); threat detection: 4 (medium demand); threat analytics: 4 (medium demand); threat response: 4 (medium demand); storage confidentiality: 4 (medium); storage integrity: 9 (high); network confidentiality: 5 (medium); network integrity: 2 (low); memory confidentiality: 4 (medium); memory integrity: 8 (high); display confidentiality: 7 (medium/high-worried about "shoulder surfers" reading data from an adjacent seat or table nearby, public location) display integrity: 2 (low); user authentication: 4 (medium, two-factor authentication using a hardware token, session expiration upon sleep, screen lock, or logout); IT administration scope: 3 (administrator can monitor, manage, and remediate remotely if the user calls them for help with IT issues); and regulatory compliance: 1 (no GDPR, No HIPAA, no PCI, no tech export restriction, etc.).

Based upon the productivity target and/or context information, a productivity target for the workspace definition may be deemed to have a value of "7" (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 7 (can use applications, can install some IT-approved applications that the user needs, but no administrator rights, because the user cannot be trusted to install only valid/safe productivity software, but can install pre-approved IT applications as needed).

Third, after the workspace definition is complete, workspace orchestration service 206 and local management agent 332 may assemble the workspace and instantiate it for the user. For example, local management agent 332 may receive definition files (e.g., JSON, XML, etc.) from workspace orchestration service 206, and it may parse the file to implement security risk controls such as: threat monitoring: 5 (local management agent installs or confirms prior installation/configuration of TDR software); threat detection: 5 (local management agent installs or confirms prior installation/configuration of TDR software); threat analytics: 5 (orchestration confirms telemetry is accessible, OS will be enrolled in logging if not already enrolled); threat response: 2 (local management agent downloads but does not run remote incident response application-preparation in case incident is detected); storage confidentiality: 5 (local management agent deploys a local container technology, such as sandbox, with restricted "save" permissions such that the confidential files will not be allowed to save locally on the PC, but can be accessed as long as the session is active in memory); storage integrity: 5; network confidentiality: 5 (local management agent steps up firewall protections, disabling all unnecessary ports, and establishes a VPN back to the corporate office for protecting traffic to the local sandbox); network integrity: 5; memory confidentiality: 5 (local management agent configures sandbox container to isolate application and data from other applications/threats that may infiltrate the host OS); memory integrity: 5; display confidentiality: 7 (local management agent confirms graphics drivers installed, enforces privacy screen and uses camera to detect specific onlooker threats); display integrity: 7; user authentication: 4 (local agent confirms basic GPO password rules are configured, and met by user—e.g., number of characters, no session expiration, etc., but also adds in a requirement for hardware token to log in and again to establish network); IT administrator scope: 4 (local agent runs with administrator and remote access privilege, confirms IT admin accounts are listed in local admin user group—e.g., per GPO); and regulatory compliance: 4 (local agent installs state specific rule enforcement or monitoring software).

After confirming the configuration, workspace orchestration service 206 and local management agent 332 may give the user access to the requested local confidential file, and the user may begin working in a newly created workspace.

A Third Use Case

In a third use-case, a user may request access to a confidential datafile in a web hosted remote portal using a browser from Kazakhstan, while at an internet café with a borrowed/rented PC configured as IHS 100, on an open WiFi network.

First, workspace orchestration service 332 intercepts the access request and evaluates the browser and user context and calculates security and productivity scores. In this use-case, there is no local management agent; all that is known is the browser and any telemetry returned or garnered through the HTTP/S session. Assume, for sake of this example, that the confidential data may kept on a shared IT-managed network resource on-premises (e.g., back in a main corporate office) and that the datafile will remain there with only remote rendering/access privileges. Web-based context may be gathered through the browser session or supplied by the user. Moreover, user context may also be collected for the workspace orchestration service through alternate side-channels (e.g., travel calendar information, recent user billing activity on corporate credit card, phone call logs, and/or location data).

When the user selects the desired confidential datafile from the web browser, the back-end web server infrastructure calls back to workspace orchestration service 206 to request a workspace definition.

In this example, workspace orchestration service 206 may score an overall security risk to have a value of "9," using a weighed, machine learning, or artificial intelligence algorithm, based upon the following context information or inputs, each of which is also scored as a risk metric based upon a selected policy: locale: 9 (Kazakhstan); user persona: 1 (user was expected to be there, the timing seems right based upon past logins, and he has a biometric watch communicator proving he is alive, himself, and located where he says he is-so that IT can always trust him); network risk: 9 (high, public and in a very obscure place); device risk: 9 (zero trust); and regulatory: 8 (based on user, data, location combinations).

Workspace orchestration service 206 may also calculate a productivity score to have a value of "5," using a weighed, machine learning, or artificial intelligence algorithm, based upon the following context information or inputs, each of which is also given as a resource metric based upon a selected policy: locale: 3 (internet café device without great performance); user persona: 9 (known high-confidence and "skilled" classification-advanced compute tasks, proficiency, and speed); network speed/latency: 3 (low quality-Wireless G from a long way away); and device performance: 3 (have to be able to tolerably browse web pages but based on what the service believes the capabilities will be, the service should build simple ones).

Second, based upon the security score and/or context information, workspace orchestration service 206 builds a workspace definition file having any suitable structure with workspace definition attributes in a machine-readable format (e.g., JSON name-value, XML structured, etc.). In this example, a security target may be deemed to have a value of "9" based upon a combination of attributes values representing loads, needs, or demands on security controls and containment features as follows: threat monitoring: 10 (high demand, to be handled on the server side); threat detection: 10 (high demand, to be handled on the server side); threat analytics: 10 (high demand, to be handled on the server side); threat response: 10 (high demand, to be handled on the server side); storage confidentiality: 10 (high demand, to be handled on the server side); storage integrity: 8; network confidentiality: 10 (high demand, to be handled on the server side); network integrity: 9; memory confidentiality: 10 (high demand, to be handled on the server side); memory integrity: 9; display confidentiality: 10 (high, "shoulder surfers" may read datafile from an adjacent seat or table nearby in a public location); display integrity: 9; user authentication: 10 (high, three-factor authentication using login, hardware token, and biometric satellite watch-session expiration and refreshes every 30 seconds); IT administrator scope: 8 (administrator may monitor, manage, and remediate remotely if the user calls them for help or anything unexpected happens); and regulatory compliance: 10 (all network traffic is securely monitored as will the data presented).

Based upon the productivity target and/or context information, a productivity target for the workspace definition may be deemed to have a value of "3" (defining a usable secure user experience primarily built for consumption and not productivity) based upon a combination of attribute values representing productivity requirements as follows: local storage: 1 (cache only); CPU access: 3 (build for limited expectations); local graphics: 3 (build for limited expectations); and application stack: 1 (web browser experience on a kiosk mode device, limited data entry capability, limited read access to need-to-know only information through VDI rendered kiosk).

Third, after the workspace definition is complete, workspace orchestration service 206 and the remote cloud web portal (e.g., session the user logged into through the browser) may assemble the workspace and instantiate it for the user in the browser. For example, the web portal may receive definition files (e.g., JSON, XML, etc.) from orchestration service 206, and it may parse the file to implement security risk controls such as: threat monitoring: 9 (data center based management agent installs or confirms prior installation/configuration of TDR software); threat detection: 9 (data center based management agent installs or confirms prior installation/configuration of TDR software); threat analytics: 9 (orchestration confirms telemetry is accessible, server hosting web server may be enrolled in logging if not already enrolled-user behavioral telemetry from side channels may also be continuously monitored for suspicious/anomalous activity); threat response: 10 (data center-based management agent sets up watchdog timer to kill session automatically without periodic check-ins from orchestration, user telemetry, and web browser); storage confidentiality: 9 (data center-based management agent builds a progressive web application that may be used to display the data through a secure TLS link—the data will be rendered but only the as-needed portions of visualization presented to the user, and nothing can be saved); storage integrity: 10; network confidentiality: 9 (route traffic through best effort to secure locations-do not allow anything except bitmap renderings through the enforceable network); network integrity: 4; memory confidentiality: 9 (web page viewer only-no data leaves the data center, no confidential input is taken from the rented PC, no keyboard input is allowed, and all input may be captured from randomized virtual keyboard using mouse click coordinates); memory integrity: 8; display confidentiality: 8 (best effort to ensure confidentiality-prompt user at least-adjustable font sizes, but defaults to small fonts, obfuscated text, etc.); display integrity: 2; user authentication: 9 (local agent confirms basic password rules are configured, and met by user—e.g., number of characters, no session expiration, etc., but also adds in a requirement for hardware token and biometric, satellite watch to log in and again to establish network, requiring frequent reconfirmation from user); IT administrator scope: 7 (data center-based remote environment); and regulatory compliance: 8 (local agent does not exist but data center-based agent monitors/blocks data not appropriate).

After confirming the configuration, workspace orchestration service 206 may give the user access to the requested data, and the user may begin working in a newly created workspace.

In many scenarios, systems and methods described herein may collect a client IHS's identifying (ID) information (e.g., serial number, service tag, etc.) or user ID (e.g., employee number, username, etc.) to perform certain orchestration operations. For example, IHS and/or user IDs may be used, along with other contextual information, to evaluate security or productivity targets and/or scores to create workspace definitions or to determine whether currently instantiated workspaces meet productivity and security targets.

There are other scenarios, however, where orchestration must be performed without the exchange of IHS/user IDs. For example, this may happen by necessity (e.g., privacy laws, regulations, etc.) or by user's choice (e.g., users who choose to protect their privacy can obfuscate their user identities from orchestration).

The deployment of temporary workspaces that can be destroyed and recreated as needed can be helpful, but it also has its own shortcomings. For example, the reuse of the same hardware repeatedly for workspace instantiation can inadvertently allow the orchestrator to accumulate data usable to create a "fingerprint" of a user's identity (and to associate the hardware ID with the user), thus subverting the need or desire keep the user's identity hidden.

To address these, and other issues, systems and methods described herein enable the verification of hardware, firmware, and/or software measurement data as a useful mechanism for an orchestrator to ensure instantiation of a workspace on the correct user's IHS, and/or that the IHS may be trusted not to undermine the workspace's security posture, without the exchange of any IHS/user IDs.

These systems and methods may perform attestation of ephemeral or temporary hardware identities (IDs) during instantiation and/or during runtime (to ensure the workspace is continuously trustworthy). This may be useful, for instance, in privacy-regulated situations where an orchestrator may not have permission to identify the user but still needs to establish a trustworthy connection to the user's IHS to instantiate a secure workspace. Moreover, users who choose to protect their privacy can obfuscate their user IDs from orchestration.

In various embodiments, ephemeral hardware IDs may be unique and cryptographically proven using attestation technologies. The lifetime of an attestation key may be sufficiently short, aligned with the lifetime of the workspace itself, such that each unique workspace instantiation has a new, fresh ephemeral hardware ID that is not associated with any previous or future IDs.

Orchestration may trust that an ephemeral hardware ID for certain operations such as data provenance if a workspace is instantiated and a hardware ID is required; but the ephemeral hardware ID may be destroyed when the workspace is no longer needed. Because the orchestrator does not remember whether the same hardware is being reused each time a new workspace is instantiated, the user cannot be tracked using the ephemeral hardware ID.

To accomplish this, a client IHS may create its own unique attestation keys each time a workspace is instantiated, and an orchestrator may retrieve class-based information from the hardware to establish whether it should trust the ephemeral hardware ID. Orchestration may also assign the ephemeral hardware ID, rather than trusting a hardware generated one, so long as the evidence provided by the client IHS contributes enough security context to raise the workspace's security score to appropriate levels required by orchestration.

Class-based evidence from a client IHS may take the form of a firmware integrity measurement or hash, or other types of information that do not disclose unique properties of the instance of client IHS (e.g., software measurements or hashes, a Software Bill of Materials or "SBOM," or a Trusted Platform Module or "TPM" quote, etc.). These measurements may be verified by orchestration against hardware vendor-endorsed reference integrity manifests, reference measurements, or "golden measurements."

Figure 4:
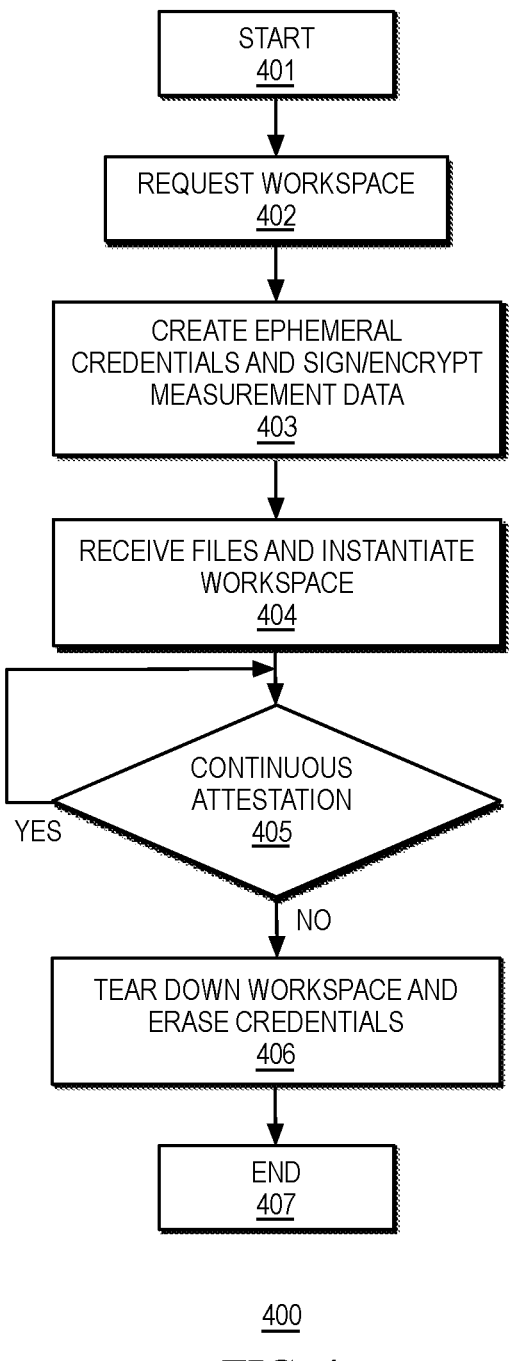
FIGS. 4 and 5 are diagrams illustrating examples of methods for workspace orchestration with ephemeral hardware attestation, according to various embodiments.
Figure 5:
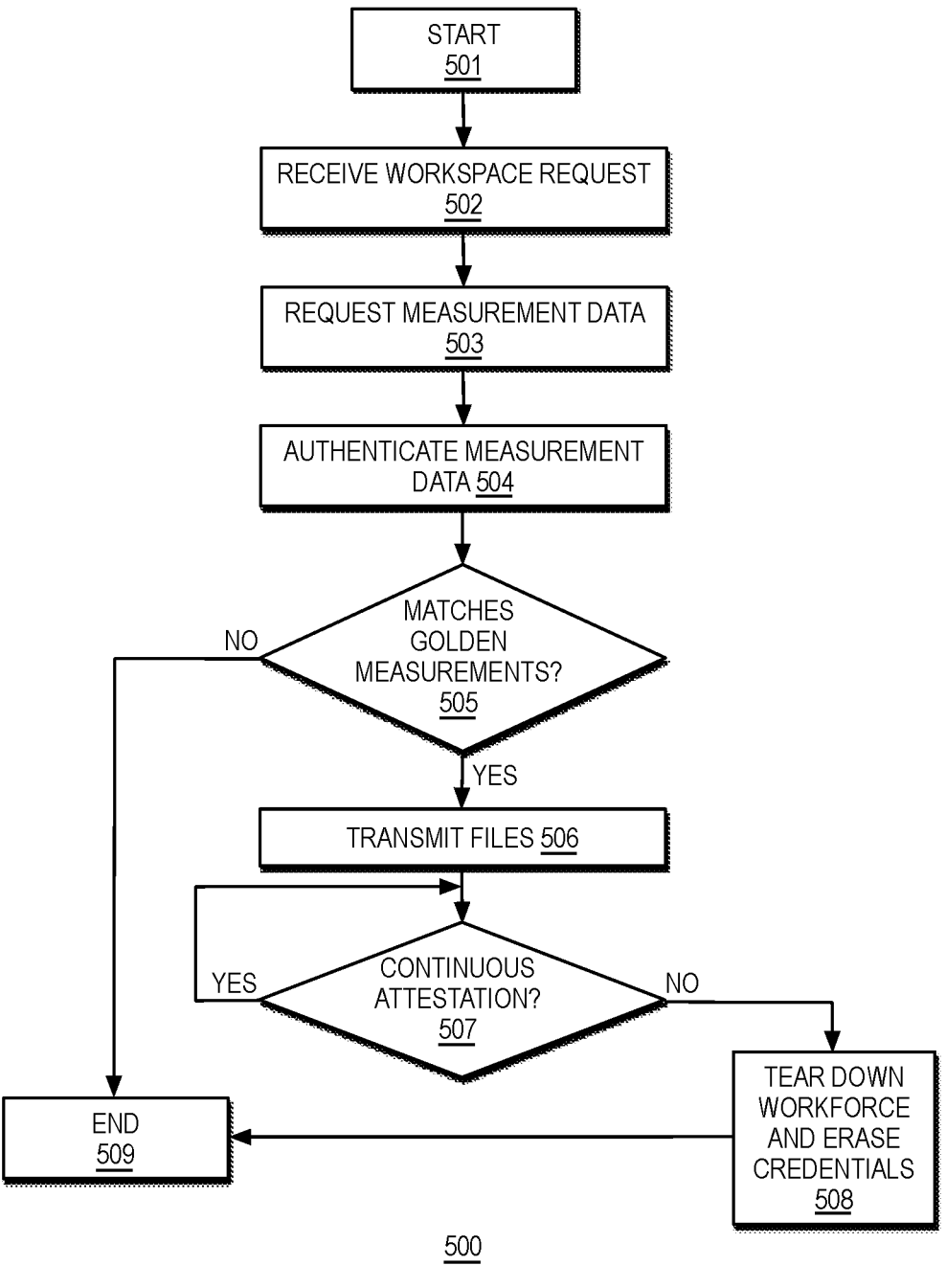

FIGS. 4 and 5 are diagrams illustrating examples of methods 400 and 500 for workspace orchestration with ephemeral hardware attestation. In various embodiments, method 400 may be performed by local management agent 332 and method 500 by workspace orchestrator 206 as part of normal workspace orchestration operations.

Specifically, method 400 starts at 401. At 402, local management agent 332 may request a workspace from workspace orchestration service 206. At 403, in response to a request from workspace orchestration service 206, for example, local management agent 332 may create ephemeral credentials and sign/encrypt measurement data. Examples of ephemeral credentials include, but are not limited to, private/public encryption key pairs, digital certificates, etc.

In various embodiments, workspace orchestration service 206 may request local management agent 332 to collect and transmit a specific type of measurement data at 404. Examples of measurement data include, but are not limited to: firmware measurements or hashes, software measurements or hashes, an SBOM, a TPM quote, etc. The measurement data may be encrypted and/or signed using ephemeral credentials, and then transmitted to workspace orchestration service 206 along with the public encryption key.

At 405, local management agent 332 and/or workspace orchestration service 206 may perform continuous attestation operations using the ephemeral credentials. If the attestation fails, at 406 local management agent 332 and/or workspace orchestration service 206 may tear down the workspace and erase the ephemeral credentials. For example, workspace orchestration service 206 may request local management agent 332 to tear down the workspace and/or erase the private key in response to the additional measurement data not matching golden measurement data.

Method 400 ends at 407. Upon a new instantiation request by local management agent 332, new ephemeral credentials (e.g., a new public/private key pair) may be generated, and prior credentials are not usable to identify the client IHS and/or the user.

Method 500 starts at 501. At 502, workspace orchestration service 206 receives a workspace instantiation request from local management agent 332. At 503, workspace orchestration service 206 may request measurement data from local management agent 332. For example, the instantiation request may indicate that anonymous orchestration services are desired by the user of the client IHS.

Alternatively, workspace orchestration service 206 may determine, based upon contextual information included in the instantiation request, that orchestration services must be provided without the exchange of IHS/user IDs (e.g., based upon a geographical location of the client IHS). For example, workspace orchestration service 206 may request measurement data in response to a determination that a security score of the client IHS is below a selected value.

At 504, workspace orchestration service 206 may decrypt the measurement data (e.g., using a public key provided by local management agent 332) and it may compare it against golden measurements. At 505, if the measurement data matches the golden measurements, at 506 workspace orchestration service 206 transmits files to local management agent 332 for instantiating a workspace.

At 507, local management agent 332 and/or workspace orchestration service 206 may perform continuous attestation operations using the ephemeral credentials. For example, local management agent 332 may transmit additional measurement data at runtime after the instantiation of the workspace, and the additional measurement data is encrypted with the private key. If the continuous attestation fails, at 508 local management agent 332 and/or workspace orchestration service 206 may tear down the workspace and erase the ephemeral credentials. Method 500 ends at 509.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) that comprises:
a processor; and
a memory coupled to the processor, the memory configured with program instructions stored thereon that, upon execution by the processor, cause the IHS to perform operations that comprise:
transmit, from a local management agent to a workspace orchestration service, measurement data comprising class-based evidence that does not disclose unique properties of the IHS, wherein the class-based evidence comprises at least one of: a firmware measurement or hash, a software measurement or hash, a Software Bill of Materials (SBOM), or a Trusted Platform Module (TPM) quote, wherein the measurement data is encrypted with an ephemeral credential created by the local management agent, wherein the ephemeral credential comprises a unique attestation key pair that is newly generated each time a workspace is instantiated, and wherein prior ephemeral credentials are not usable to identify the IHS and/or any user of the IHS;
receive, at the local management agent in response to attestation of the measurement data by the workspace orchestration service, a workspace definition configured to enable the local management agent to instantiate a workspace;
instantiate the workspace with a workspace lifetime that is not longer than a lifetime of the ephemeral credential;
perform continuous attestation operations of the workspace based at least in part on the ephemeral credential; and
in response to a failure of the continuous attestation operations, tear down the workspace and erase the ephemeral credential.

2. The IHS of claim 1, wherein the ephemeral credential further comprises a private key paired to a public key, and wherein the program instructions further cause the IHS to transmit the public key to the workspace orchestration service.

3. The IHS of claim 2, wherein the program instructions, upon execution, further cause the local management agent to produce the private and public keys in response to a request for the measurement data by the workspace orchestration service.

4. The IHS of claim 1, wherein the program instructions, upon execution, further cause the local management agent to transmit the measurement data in response to a determination, by the workspace orchestration service, that a security score of the IHS is below a selected value.

5. The IHS of claim 4, wherein the security score is calculated, at least in part, based upon at least one of: a risk metric associated with a locale of the IHS, a risk metric associated with a network of the IHS, a risk metric associated with hardware of the IHS, a risk metric associated with a requested datafile, or a regulatory risk metric.

6. The IHS of claim 1, wherein to attest the measurement data, the workspace orchestration service is configured to compare the measurement data against golden measurement data.

7. The IHS of claim 2, wherein the program instructions, upon execution, further cause the IHS to transmit additional measurement data from the local management agent to the workspace orchestration service after the instantiation of the workspace, and wherein the additional measurement data is encrypted with the private key.

8. The IHS of claim 7, wherein the workspace orchestration service is configured to request the local management agent to tear down the workspace in response to a determination that the additional measurement data is not a match to golden measurement data.

9. The IHS of claim 7, wherein the workspace orchestration service is configured to request the local management agent to erase the private key in response to a determination that the additional measurement data is not a match to golden measurement data.

10. A memory storage device configured with program instructions stored thereon that, upon execution by one or more processors of an Information Handling System (IHS) configured to execute a workspace orchestration service, cause the IHS to:
in response to a request from a client IHS to instantiate a workspace, request encrypted measurement data from the client IHS, wherein the measurement data does not identify the client IHS or a user of the client IHS, wherein the measurement data is to be encrypted with an ephemeral credential created by a local management agent of the client IHS, wherein the measurement data comprises class-based evidence that does not disclose unique properties of the client IHS, wherein the class-based evidence comprises at least one of: a firmware measurement or hash, a software measurement or hash, a Software Bill of Materials (SBOM), or a Trusted Platform Module (TPM) quote, wherein the ephemeral credential comprises a unique attestation key pair that is newly generated each time the workspace is instantiated, and wherein prior ephemeral credentials are not usable to identify the client IHS and/or any user of the client IHS;
transmit, to the local management agent of the client IHS in response to attestation of the encrypted measurement data, a workspace definition configured to enable the local management agent to instantiate the workspace with a workspace lifetime that is not longer than a lifetime of the ephemeral credential;
perform continuous attestation operations based at least in part on the ephemeral credential after instantiation of the workspace; and
in response to a failure of the continuous attestation operations, transmit a command to the local management agent to tear down the workspace and erase the ephemeral credential.

11. The memory storage device of claim 10, wherein the program instructions, upon execution, cause the IHS to decrypt the measurement data with a temporary public key provided by the client IHS.

12. The memory storage device of claim 10, wherein the program instructions, upon execution, further cause the IHS to request the measurement data in response to a determination, by the workspace orchestration service, that a security score of the client IHS is below a selected value.

13. The memory storage device of claim 12, wherein the security score is calculated, at least in part, based upon at least one of: a risk metric associated with a locale of the client IHS, a risk metric associated with a network of the client IHS, a risk metric associated with hardware of the client IHS, a risk metric associated with a requested datafile, or a regulatory risk metric.

14. The memory storage device of claim 10, wherein to attest the measurement data, the program instructions, upon execution, further cause the IHS to compare the measurement data against golden measurement data.

15. The memory storage device of claim 10, wherein the program instructions, upon execution, further cause the IHS to request additional measurement data from the local management agent after the instantiation of the workspace.

16. The memory storage device of claim 15, wherein the program instructions, upon execution, further cause the IHS to transmit a command to the local management agent to tear down the workspace in response to a determination that the additional measurement data is not a match to golden measurement data.

17. A method, comprising:

creating a workspace definition based upon encrypted measurement data received from a local management agent of an Information Handling System (IHS) in an absence of any identification of the IHS or any user of the IHS, wherein the measurement data is encrypted with an ephemeral credential created by the local management agent of the IHS, wherein the measurement data comprises class-based evidence that does not disclose unique properties of the IHS, wherein the class-based evidence comprises at least one of: a firmware measurement or hash, a software measurement or hash, a Software Bill of Materials (SBOM), or a Trusted Platform Module (TPM) quote, wherein the ephemeral credential comprises a unique attestation key pair that is newly generated each time a workspace is instantiated, and wherein prior ephemeral credentials are not usable to identify the IHS and/or any user of the IHS;

transmitting one or more files to the IHS, wherein the one or more files are configured to enable the local management agent to instantiate a workspace based upon the workspace definition, wherein the workspace has a workspace lifetime that is not longer than a lifetime of the ephemeral credential;

performing continuous attestation operations of the workspace using the ephemeral credential; and in response to a failure of the continuous attestation operations, tearing down the workspace and erasing the ephemeral credential.

* * * * *